(12) United States Patent
Shteyn et al.

(10) Patent No.: US 7,917,557 B2
(45) Date of Patent: Mar. 29, 2011

(54) METHOD AND DEVICES FOR CREATING A SECOND PLAYLIST BASED ON A FIRST PLAYLIST

(75) Inventors: Eugene Shteyn, Cupertino, CA (US); Vladimir Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 771 days.

(21) Appl. No.: 10/235,122

(22) Filed: Sep. 5, 2002

(65) Prior Publication Data

US 2004/0057348 A1   Mar. 25, 2004

(51) Int. Cl.
*G06F 7/00* (2006.01)
(52) U.S. Cl. .............................................. 707/999.107
(58) Field of Classification Search ............... 369/30.08, 369/30.05, 30.07, 30.09, 30.18, 30.19, 30.15, 369/47.12, 83; 707/104.1, 100, 101, 102, 707/205, 999.107, 999.1, 999.102, 999.205
See application file for complete search history.

(56) References Cited

U.S. PATENT DOCUMENTS

| | | | |
|---|---|---|---|
| 6,097,557 A | 8/2000 | Inoue et al. | |
| 6,185,163 B1 * | 2/2001 | Bickford et al. | 369/7 |
| 6,226,672 B1 | 5/2001 | DeMartin et al. | |
| 6,272,078 B2 * | 8/2001 | Yankowski | 369/30.28 |
| 6,377,530 B1 * | 4/2002 | Burrows | 369/30.3 |
| 6,542,445 B2 * | 4/2003 | Ijichi et al. | 369/30.08 |
| 7,043,479 B2 | 5/2003 | Ireton | |
| 7,096,234 B2 * | 8/2006 | Plastina et al. | 707/104.1 |
| 2001/0026504 A1 * | 10/2001 | Nonaka et al. | 369/32 |
| 2002/0093886 A1 | 7/2002 | Ijichi et al. | |
| 2003/0058781 A1 * | 3/2003 | Millikan et al. | 369/30.07 |
| 2003/0097379 A1 | 5/2003 | Ireton | |
| 2003/0226019 A1 * | 12/2003 | Nonaka et al. | 713/168 |
| 2006/0235550 A1 * | 10/2006 | Csicsatka et al. | 700/94 |

FOREIGN PATENT DOCUMENTS

| | | |
|---|---|---|
| JP | 1132070 A | 2/1999 |
| JP | 11032070 | 2/1999 |
| JP | 2001266545 | 9/2001 |
| JP | 2001266545 A | 9/2001 |
| JP | 2001350484 A | 12/2001 |
| WO | PCT/JP99/06101 | 11/1999 |
| WO | 0026911 | 5/2000 |
| WO | PCT/JP00/07159 | 4/2001 |

\* cited by examiner

*Primary Examiner* — Tan X Dinh

(57) ABSTRACT

A playback system and method allows for dynamic remapping of location identifiers in a playlist. An original playlist is created based on select content material located at a first set of storage locations. When the playlist is transferred to a different environment, having access to a second set of storage locations containing unknown content material, the playback device at this different environment searches the second set of storage locations for content material that corresponds to the items/songs in the playlist. If a correspondence is determined for a song in the playlist, the location identifier of the playlist for this song is updated to reflect its location in the second set of storage locations. If a correspondence is not found, the location identifier of the playlist for this song is updated to reflect a "not found" indication. Thereafter, when directed to effect a playback of the material in the playlist, the playback device will render the songs that were found at the second set of storage locations, and skip those that are marked "not found". By dynamically updating the location identifiers of a playlist based on the available content at a given system, the playlist becomes a means for communicating a user's preferred set of songs without actually transferring the songs. In a preferred embodiment, additional filtering criteria may be applied, in addition to the availability of the material within the current environment.

10 Claims, 1 Drawing Sheet

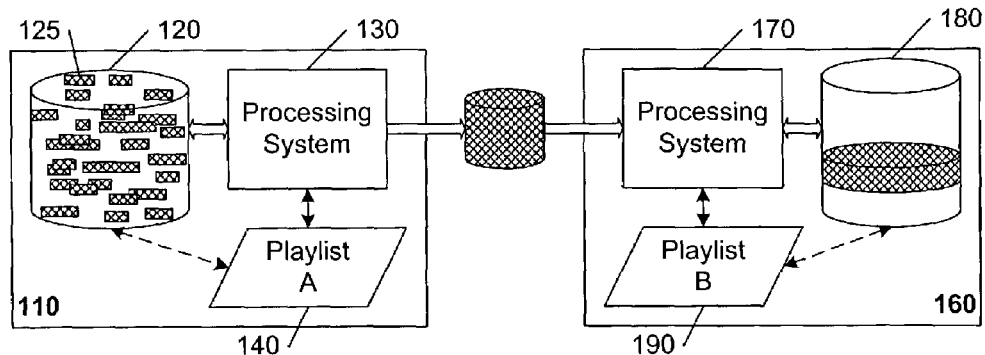
FIG. 1 [Prior Art]
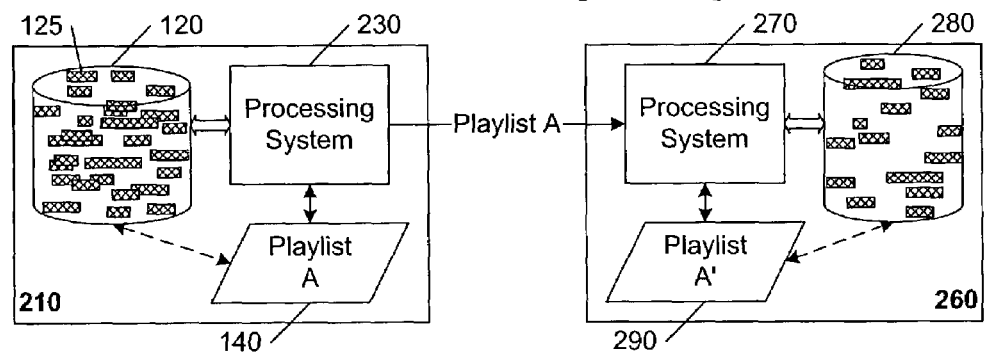
FIG. 2
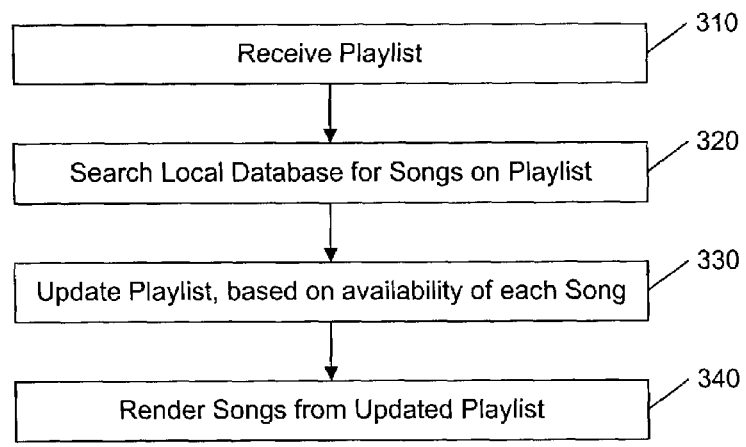
FIG. 3

METHOD AND DEVICES FOR CREATING A SECOND PLAYLIST BASED ON A FIRST PLAYLIST

BACKGROUND OF THE INVENTION

1. Field of the Invention

This invention relates to the field of consumer electronics, and in particular to a method and system for enabling playback devices to use playlists, or other forms of identification of select songs, from other systems.

2. Description of Related Art

The availability of entertainment material, such as audio recordings, continues to increase, particularly in view of the compression provided by particular encoding schemes, such as MP3. A single CD is able to store about 200 MP3-encoded songs; a DVD is able to store as many as 1500 MP3 songs. With the cost of storage devices continuing to decrease, it is not unusual for a person to have immediate access to thousands of songs. Home networking and network attached storage enable even greater accumulation of user content. Similar trends can be observed in car entertainment systems, as well as portable hard disk based players, such as iPod, by Apple. For example, home networking standard UPnP defines standard components of a home system that are enabled to stream, receive and control play-out, or playback, of content.

To facilitate the playback of select subsets of a user's collection, many playback devices allow the user to define such subsets, hereinafter termed "playlists". A user may define a "favorites" playlist that contains an eclectic collection of songs that the user likes. Another playlist may be a "romantic" playlist that contains songs that the user prefers during a romantic interlude. Another playlist may be a "party" playlist that contains jovial and uplifting songs. Facilities are often available for automatically creating playlists, based on selected preferences of genre, artist, composer, etc. Facilities are also provided for searching one or more storage devices for select content material, such as all audio files, or all MP3 files, or all WINAMP-compatible files, and so on.

Each playlist generally contains an identification of the song and the artist, and an identification of the file that includes the song. When a particular playlist is selected, the playback system sequences through the songs that are identified in the playlist, retrieving the content material from each of the identified files. The sequence may be ordered or random, depending upon the user's preference at the time of playback.

A playlist may also be used to create a copy of content material corresponding to the playlist. That is, for example, a user may create a CD containing some or all of the songs that are identified in one or more selected playlists. Using the aforementioned categories of playlists, a user may create a "favorites" CD, a "romantic" CD, a "party" CD, and so on. Note that, because the location of the files containing the songs on the CD will be different than the location of the files that were used to provide the songs, the contents of a playlist for the songs on the CD differs from the contents of the playlist for the original songs. That is, although the same songs may be contained on the CD and at the original storage locations, when one playlist is used for playback, the songs will be accessed from the CD, and when the other playlist is used, the songs will be accessed from the original storage locations.

If a user desires to play songs from a playlist on another playback device, the user must transfer the content material corresponding to the playlist to the other playback device, either by transferring files via a communications network, or by the physical transport of removable storage media, such as a CD, DVD, MP3-player, and the like. This transfer must occur in order to provide the files corresponding to each entry in the playlist, regardless of the available content material that may exist at the other playback device.

FIG. 1 illustrates an example block diagram of a prior art system for the transfer of content material from a source system 110 to a destination system 160, based on a playlist A 140 at the source system 110. The playlist A 140 identifies particular content items 125 within a storage area 120 on the source system 110. The storage area 120 typically includes one or more non-volatile storage devices, such as disk drives or solid-state memory devices, and may include removable storage media, such as a CD, DVD, memory-stick, and so on. The playlist A 140 includes an identification of each content item 125 and an identification of the location of the content item 125 within the storage area 120 of the system 110.

To effect a transfer of the content material corresponding to the playlist A 140, the processing system 130 locates each content item 125 that is identified in the playlist A 140, and transfers a copy of each content item 125 to the destination system 160, as indicated by the dataset 150 from the source system 110. The dataset 150 may be transferred via a removable media that is transported from the source system 110 to the destination 160, or via a communications channel between the systems 110 and 160.

When the destination system 160 receives the dataset 150, the processing system 170 stores a copy 185 of the dataset 150 in a storage area 180 of the system 160. Alternatively, particularly in the case of the transfer of the dataset 150 via a removable media, the removable media may form the added element 185 of the storage area 180. As illustrated in FIG. 1, the copy 185 of the dataset 150, which is a copy of the content items 125, forms a discrete region of the storage area 180, typically as an added allocation of the storage area 180. To facilitate the playback of the copies 185 of the content items 125 in the storage area 180, the processing system 170 also creates a playlist B 190 that identifies the copies 185 of the content items 125 and their particular location within the storage area 180. The playlist B 190 substantially corresponds to the playlist A 140, except that the identification of the location of each content item 125 of the playlists A 140 and B 190 in the storage areas 120 and 180 differ.

As illustrated, to effect the transfer of a playlist A 140 of select content items 125, the prior art system of FIG. 1 requires a transfer of the dataset 150, regardless of other content items at the storage area 180.

BRIEF SUMMARY OF THE INVENTION

It is an object of this invention to facilitate the use of a predefined playlist at a playback device. It is a further object of this invention to facilitate the use of a predefined playlist at a playback device without requiring a corresponding transfer of content material. It is another object of the invention to facilitate the use of a predefined playlist in a distributed network environment. It is yet another object of the invention to enable a third party services for supplying content management services to content owners.

These objects, and others, are achieved by providing a playback system and method that allows for dynamic remapping of location identifiers in a playlist. An original playlist is created based on select content material located at a first set of storage locations. When the playlist is transferred to a different environment, having access to a second set of storage locations containing unknown content material, the playback device at this different environment searches the second set of storage locations for content material that corresponds to the items/songs in the playlist. If a correspondence is determined for a song in the playlist, the location identifier of the playlist for this song is updated to reflect its location in the second set of storage locations. If a correspondence is not found, the location identifier of the playlist for this song is updated to reflect a "not found" indication. Thereafter, when directed to effect a playback of the material in the playlist, the playback device will render the songs that were found at the second set of storage locations, and skip those that are marked "not found". By dynamically updating the location identifiers of a playlist based on the available content at a given system, the playlist becomes a means for communicating a user's preferred set of songs without actually transferring the songs. In a preferred embodiment, additional filtering criteria may be applied, in addition to the availability of the material within the current environment. The dynamic updating of the location identifiers may also be effected by devices external to the playback device, such as a network utility program that updates the location identifiers of a given playlist to correspond to material that is currently available on the network.

BRIEF DESCRIPTION OF THE DRAWINGS

The invention is explained in further detail, and by way of example, with reference to the accompanying drawings wherein:

FIG. 1 illustrates an example block diagram of a prior art system for the transfer of content material based on a playlist.

FIG. 2 illustrates an example block diagram of a system for the transfer of a portable playlist in accordance with this invention.

FIG. 3 illustrates an example flow diagram of a processing system for enabling playback of content material based on a portable playlist in accordance with this invention.

Throughout the drawings, the same reference numerals indicate similar or corresponding features or functions.

DETAILED DESCRIPTION OF THE INVENTION

This invention is premised on the observation that some similarity, or overlap, of content material typically exists among stored content material at different playback systems. For example, if a user has multiple playback devices, it is likely that many of the same content items will be present on each device. That is, a user may have a multiple-CD playback device, a personal computer upon which copies of select CDs are stored, a portable computer upon which other copies of select CDs are stored, an MP3 player that contains select songs, and so on. Although the content material within the storage areas of each particular playback device is unlikely to be identical, it is likely that some commonality will exist among these sets of content material. In like manner, users who have a common background, such as members of a common age-generation, or members of a common social group, are likely to share a common interest in entertainment material, and likely have many of the same songs in their respective collections of stored content material.

This invention is also premised on the observation that, in most cases, when a user creates a playlist, the entirety of the content material identified in the playlist is not essential. In some instances, a user may create a playlist that contains particular songs that are arranged in a particular order to achieve a particular effect, but in most cases, a complete playback of the entire collection of items identified in the playlist is not necessary to enjoy the selections in the playlist. That is, for example, a user may create a playlist of "favorite country music" that contains hundreds of songs. Each of the songs in a subset of the playlist constitutes a "favorite country song" of the user, regardless of whether all of the hundreds of songs are contained in this subset.

This invention is also premised on the observation that, from a user perspective, the particular location of a content item in a storage area is immaterial. That is, traditional playlists that differ merely by the location of the content material in storage areas are generally considered by a user to be the "same" playlist.

FIG. 2 illustrates an example block diagram of a system for the transfer of a portable playlist in accordance with this invention. Of particular note is the destination system 260. In accordance with this invention, the processing system 270 of the destination system 260 is configured to search a storage area 280 for content items 285 that are identified in a playlist 290 that is communicated from a source system 210. Based on the identification of the content items in the playlist 290, the processing system 270 searches the storage area 280 for content items that match the identification in the playlist 290. If a matching item 285 is found, the identification of the matching content item and its location in the storage area 280 are stored in the playlist 290. If a matching content item is not found in the storage area 280, the identification of the content item in the playlist 290 is marked as 'not found'; optionally, this identification may be deleted from the playlist 290.

In a straightforward embodiment, the source system 210 communicates a copy of the conventional playlist A 140 to the destination system 260, and the processing system 270 modifies this playlist to form the playlist A' 290, based on the locations of the matched content items 285 in the storage area 280. Alternatively, the source system 210 may communicate more information than is traditionally contained in a playlist A 140, to facilitate the search by the processing system 270 for a matching item. For example, the source system 210 may communicate the "CDID" that identifies the CD from which each song was copied. Also alternatively, the source system 210 may communicate less information than is traditionally contained in the playlist A 140, such as the location information that identifies the location of each song in the storage area 120 of the source system 210.

Note that, because the processing system 270 searches for corresponding content items that match the entries in the playlist that is communicated from the source system 210, the communicated playlist is truly "portable". If a user, for example, creates a playlist of "romantic songs", the user may bring this playlist to a friend's home and, assuming the friend has a playback device 260 as detailed herein, and assuming the friend has some or all of the same songs in a storage area 280, the user and friend can share the user's particular selection of romantic songs, or a subset thereof. In another application, a "disc-jockey" may broadcast a playlist to a number of subscribers, and each subscriber will produce a custom-playlist that is matched to the subscriber's current collection of songs. In this manner, for example, a user that has a large collection of songs can enjoy the disc-jockey's selection, but will not be burdened with downloading each of the songs. In an alternative embodiment of this invention, the creator of the playlist may also include ancillary information, such as introductory or terminal comments associated with select entries, and the playback device 260 is configurable to optionally render such information for each matched content item.

FIG. 3 illustrates an example flow diagram of a processing system at a destination system for enabling playback of content material based on a portable playlist in accordance with this invention.

At 310, the playlist is received from a source system. As noted above, this playlist need only contain an identification of each content item in the playlist, and may contain ancillary information to facilitate a search for a matching content item at the destination system.

At 320 the destination system's storage area is searched for content items that match each content item in the playlist, and at 330, the playlist is updated to reflect the outcome of this search. If a matching item is found, the playlist is updated to associate the storage location of the matching item to the corresponding entry in the playlist. If a matching item is not found, either the corresponding entry in the playlist is deleted, or a 'not found' indication is associated with the entry in the playlist.

After the playlist is modified to include the storage location of content items that match entries in the playlist, the destination system uses this playlist to effect a rendering of each of the matched content items, using conventional rendering techniques.

As would be evident to one of ordinary skill in the art, in view of his disclosure, the above described remapping of location identifiers in a playlist can be effected via a network, including ad-hoc networks. A device on the network may be configured to receive a playlist, and to provide therefrom a playlist that contains the location identifiers of the matched content items. For example a network remote control device, such as Philips iPronto, can be configured to receive the playlist and then map it to available storage and playback devices on the network.

In a preferred embodiment of this invention, additional factors or attributes may be introduced to the matching process of FIG. 3 to include, for example, user access rights (DRM), content quality, rendering capabilities of the playback device, and so on. Additional factors or attributes may be dynamically defined. For example, the user may select "Playlist A, but not Performers X and Y"; or, "Playlist B, but nothing longer than three minutes"; or "Playlist C, plus anything else currently available that is catergorized as "classic", but not Mozart; and so on.

As would be evident to one of ordinary skill in the art, in view of this disclosure, one or more ancillary programs or applications may be employed to generate the factors or attributes that may be used within the matching process of FIG. 3. For example, a learning system may be configured to determine a correlation between particular environmental conditions and songs selected or rejected from a given playlist; thereafter, when the user specifies a particular environment or the system determines the particular environment, the determination of the items included in the remapped playlist may be prioritized by the user's prior history. Similarly, a user may explicitly define such correlations, and envoke the appropriate filters by specifying one or more current environment factors, or qualifiers. For example, a user may identify certain selections in a playlist as not being suitable for rendering while the user is with "new aquaintance", or while a "client" is in the user's office. When the system recognizes, or is informed of, the occurrence of these situations, the system will modify the playlist accordingly.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the portable playlist may also be used to facilitate a transfer of content material to a destination system 260. If the destination system 260 has network access to alternative sources of content material, the system 260 can be configured to search the storage area 280 for matching content items, and then searching the alternative sources if a matching content item is not found within the storage area 280. If a matching content item is subsequently found, the system 260 downloads a copy of the content item, preferably as a "background task", and updates the playlist A' 290 accordingly. In this manner, only the songs on the playlist that are absent from the storage area 280 are added to the storage area 280, as compared to the conventional content transfer process that is illustrated in FIG. 1. These and other system configuration and optimization features will be evident to one of ordinary skill in the art in view of this disclosure, and are included within the scope of the following claims.

We claim:

1. A device, comprising:
a first storage unit that is configured to store a plurality of content items, and
a processing system that is configured:
to receive a portable playlist from a second device having a second storage unit, wherein the portable playlist includes (i) a plurality of content identifiers that identify content items stored in the second storage unit and (ii) ancillary information in the form of introductory or terminal comments associated with select entries of content identifiers of the portable playlist, wherein the second storage unit of the second device is different from the first storage unit of said device,
to search the first storage unit and identify content items stored in the first storage unit that match content items stored in the second storage unit based on the content identifiers of the portable playlist,
to create a second playlist corresponding to a destination device playlist without requiring a corresponding transfer of content items from the second storage unit to the first storage unit that includes: (1) a subset of the content identifiers of the portable playlist corresponding to the content items (a) searched for and (b) identified as being stored in the first storage unit that match based on the content identifiers of the portable playlist, including the corresponding ancillary information associated with select entries of content identifiers of the portable playlist; and (2) associated location identifiers of the first storage unit each identifying a location in the first storage unit where is stored a corresponding one of the content items that match based on the content identifiers of the portable playlist, and
to render one or more of the content items identified in the second playlist, including corresponding ancillary information in the form of introductory or terminal comments associated with select entries of content identifiers of the second playlist.

2. A playback device comprising:
a first storage that is configured to store a plurality of stored content items, and
a processing system that is configured:
to receive a portable playlist that includes (i) a plurality of content identifiers that identify content items stored in a second storage and (ii) ancillary information in the form of introductory or terminal comments associated with select entries of content identifiers of the portable playlist, wherein the second storage is of a second device and different from the first storage of said playback device,
to search the first storage and identify content items of the plurality of stored content items of the first storage that match content items of the second storage, based on the plurality of content identifiers of the portable playlist, to create a second playlist corresponding to a destination device playlist without requiring a corresponding transfer of content items from the second storage to the first storage that includes: (1) a subset of the plurality of content identifiers of the portable playlist having matching content items identified via the search of the first storage, including the corresponding ancillary information associated with select entries of content identifiers of the portable playlist, and (2) associated location identifiers of each of the matching content items that identify a corresponding location within the first storage, to obtain other content items from an external source, the other content items corresponding to non-matching content items based on content identifiers of the plurality of content identifiers of the portable playlist for which matching content items were searched for and identified as not found in the first storage of the playback device, and to render one or more of the content items identified in the second playlist, including corresponding ancillary information in the form of introductory or terminal comments associated with select entries of content identifiers of the second playlist.

3. The playback device of claim 1, wherein
the content identifiers include at least one of:
a title, an artist, an author, a composer, and a CDID.

4. The playback device of claim 1, wherein
the processing device is further configured to create the second playlist based on one or more other selection criteria.

5. A device, comprising:
a processing system that is configured:
to receive a portable playlist that includes (i) a plurality of content identifiers that identify content items stored in a first storage unit of a first device and (ii) ancillary information in the form of introductory or terminal comments associated with select entries of content identifiers of the portable playlist, to search a second storage unit and identify content items stored in the second storage unit that match content items of the first storage unit based on the content identifiers of the portable playlist, wherein the second storage unit of said device is different from the first storage unit of the first device, to create a second playlist corresponding to a destination device playlist without requiring a corresponding transfer of content items from the first storage unit to the second storage unit that includes: (1) a subset of the content identifiers of the portable playlist corresponding to the content items (a) searched for and (b) identified as being stored in the second storage unit that match content items stored in the first storage unit based on the content identifiers of the portable playlist, including the corresponding ancillary information associated with select entries of content identifiers of the portable playlist; and (2) associated location identifiers of the second storage unit each identifying a location in the second storage unit where is stored a corresponding one of the content items that match based on the content identifiers of the portable playlist, and to transmit the second playlist to a playback device for subsequent rendering of the content items identified in the second playlist, including rendering of corresponding ancillary information in the form of introductory or terminal comments associated with select entries of content identifiers of the second playlist.

6. The playlist creation device of claim 5, wherein
the content identifiers include at least one of:
a title, an artist, an author, a composer, and a CDID.

7. The playlist creation device of claim 5, wherein
the processing device is further configured to create the second playlist based on one or more other selection criteria.

8. A method of facilitating playback of select content items, the method comprising:
receiving a portable playlist that includes (i) a plurality of content identifiers that identify content items stored in a first storage device and (ii) ancillary information in the form of introductory or terminal comments associated with select entries of content identifiers of the portable playlist, searching a second storage device and identifying content items stored in the second storage unit that match content items stored in the first storage device based on the content identifiers of the portable playlist, wherein the second storage device is different from the first storage device, creating a second playlist corresponding to a destination device playlist without requiring a corresponding transfer of content items from the first storage device to the second storage device that includes: (1) a subset of the plurality of content identifiers of the portable playlist corresponding to the content items searched for and identified as being stored in the second storage unit that match content items stored in the first storage device based on the content identifiers of the portable playlist, including the corresponding ancillary information associated with select entries of content identifiers of the portable playlist; and (2) associated location identifiers of the second storage device each identifying a location in the second storage unit where is stored a corresponding one of the content items identified in the second playlist, and rendering one or more of the content items identified in the second playlist, including corresponding ancillary information in the form of introductory or terminal comments associated with select entries of content identifiers of the second playlist.

9. The method of claim 8, wherein the content identifiers include at least one of: a title, an artist, an author, a composer, and a CDID.

10. The method of claim 8, wherein
creating the second playlist further includes selecting the content items identified in the second playlist based on one or more selection criteria.

* * * * *